US011589397B1

(12) United States Patent
Sakhnini et al.

(10) Patent No.: US 11,589,397 B1
(45) Date of Patent: Feb. 21, 2023

(54) TECHNIQUES FOR RADIO LINK FAILURE RECOVERY DURING BANDWIDTH PART HOPPING

(71) Applicant: QUALCOMM Incorporated, San Diego, CA (US)

(72) Inventors: Iyab Issam Sakhnini, San Diego, CA (US); Changhwan Park, San Diego, CA (US); Tao Luo, San Diego, CA (US); Prashant Sharma, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/447,896

(22) Filed: Sep. 16, 2021

(51) Int. Cl.
*H04W 74/08* (2009.01)
*H04L 5/00* (2006.01)
*H04W 72/04* (2009.01)
*H04W 74/00* (2009.01)
*H04W 76/19* (2018.01)
*H04W 72/044* (2023.01)

(52) U.S. Cl.
CPC ....... *H04W 74/0841* (2013.01); *H04L 5/0012* (2013.01); *H04W 72/044* (2013.01); *H04W 74/002* (2013.01); *H04W 76/19* (2018.02)

(58) Field of Classification Search
CPC ............ H04W 74/0841; H04W 76/19; H04W 72/044; H04W 74/002; H04L 5/001
See application file for complete search history.

(56) References Cited

U.S. PATENT DOCUMENTS

| 2019/0364602 | A1* | 11/2019 | Yi | .......................... | H04W 72/04 |
| 2021/0274568 | A1* | 9/2021 | Sengupta | ............ | H04W 56/005 |
| 2021/0306059 | A1* | 9/2021 | Sakhnini | ................ | H04W 24/10 |
| 2021/0314982 | A1* | 10/2021 | Panteleev | .............. | H04L 5/0053 |
| 2021/0360616 | A1* | 11/2021 | Yi | ...................... | H04W 72/0413 |

* cited by examiner

*Primary Examiner* — Kashif Siddiqui
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a bandwidth part (BWP) hopping configuration indicating a set of hops for a BWP of the UE. The UE may identify a radio link failure (RLF) during a time period configured by the set of hops. The UE may disable the BWP hopping configuration based at least in part on identifying the RLF. The UE may initiate a random access procedure on a BWP that is associated with the random access procedure. Numerous other aspects are described.

30 Claims, 10 Drawing Sheets

TECHNIQUES FOR RADIO LINK FAILURE RECOVERY DURING BANDWIDTH PART HOPPING

FIELD OF THE DISCLOSURE

Aspects of the present disclosure generally relate to wireless communication and to techniques and apparatuses for radio link failure recovery during bandwidth part hopping.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a bandwidth part (BWP) hopping configuration indicating a set of hops for a BWP of the UE. The method may include identifying a radio link failure (RLF) during a time period configured by the set of hops. The method may include disabling the BWP hopping configuration based at least in part on identifying the RLF. The method may include initiating a random access procedure on a BWP that is associated with the random access procedure.

Some aspects described herein relate to a method of wireless communication performed by a base station. The method may include transmitting a BWP hopping configuration indicating a set of hops for a BWP of a UE. The method may include transmitting an indication of a BWP, of the UE, to be used for a random access procedure resulting from RLF that occurs during a time period configured by the set of hops. The method may include receiving a communication associated with the random access procedure on the BWP to be used for the random access procedure.

Some aspects described herein relate to an apparatus for wireless communication at a UE. The apparatus may include a memory and one or more processors, coupled to the memory. The one or more processors may be configured to receive a BWP hopping configuration indicating a set of hops for a BWP of the UE. The one or more processors may be configured to identify a RLF during a time period configured by the set of hops. The one or more processors may be configured to disable the BWP hopping configuration based at least in part on identifying the RLF. The one or more processors may be configured to initiate a random access procedure on a BWP that is associated with the random access procedure.

Some aspects described herein relate to an apparatus for wireless communication at a base station. The apparatus may include a memory and one or more processors, coupled to the memory. The one or more processors may be configured to transmit a BWP hopping configuration indicating a set of hops for a BWP of a UE. The one or more processors may be configured to transmit an indication of a BWP, of the UE, to be used for a random access procedure resulting from RLF that occurs during a time period configured by the set of hops. The one or more processors may be configured to receive a communication associated with the random access procedure on the BWP to be used for the random access procedure.

Some aspects described herein relate to a non-transitory computer-readable medium that stores a set of instructions for wireless communication by a UE. The set of instructions, when executed by one or more processors of the UE, may cause the UE to receive a BWP hopping configuration indicating a set of hops for a BWP of the UE. The set of instructions, when executed by one or more processors of the UE, may cause the UE to identify a RLF during a time period configured by the set of hops. The set of instructions, when executed by one or more processors of the UE, may cause the UE to disable the BWP hopping configuration based at least in part on identifying the RLF. The set of instructions, when executed by one or more processors of the UE, may cause the UE to initiate a random access procedure on a BWP that is associated with the random access procedure.

Some aspects described herein relate to a non-transitory computer-readable medium that stores a set of instructions for wireless communication by a base station. The set of instructions, when executed by one or more processors of the base station, may cause the base station to transmit a BWP hopping configuration indicating a set of hops for a BWP of a UE. The set of instructions, when executed by one or more processors of the base station, may cause the base station to transmit an indication of a BWP, of the UE, to be used for a random access procedure resulting from RLF that occurs during a time period configured by the set of hops. The set of instructions, when executed by one or more processors of the base station, may cause the base station to receive a communication associated with the random access procedure on the BWP to be used for the random access procedure.

Some aspects described herein relate to an apparatus for wireless communication. The apparatus may include means for receiving a BWP hopping configuration indicating a set of hops for a BWP of the apparatus. The apparatus may include means for identifying a RLF during a time period configured by the set of hops. The apparatus may include means for disabling the BWP hopping configuration based at least in part on identifying the RLF. The apparatus may include means for initiating a random access procedure on a BWP that is associated with the random access procedure.

Some aspects described herein relate to an apparatus for wireless communication. The apparatus may include means for transmitting a BWP hopping configuration indicating a set of hops for a BWP of a UE. The apparatus may include means for transmitting an indication of a BWP, of the UE, to be used for a random access procedure resulting from RLF that occurs during a time period configured by the set of hops. The apparatus may include means for receiving a communication associated with the random access procedure on the BWP to be used for the random access procedure.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
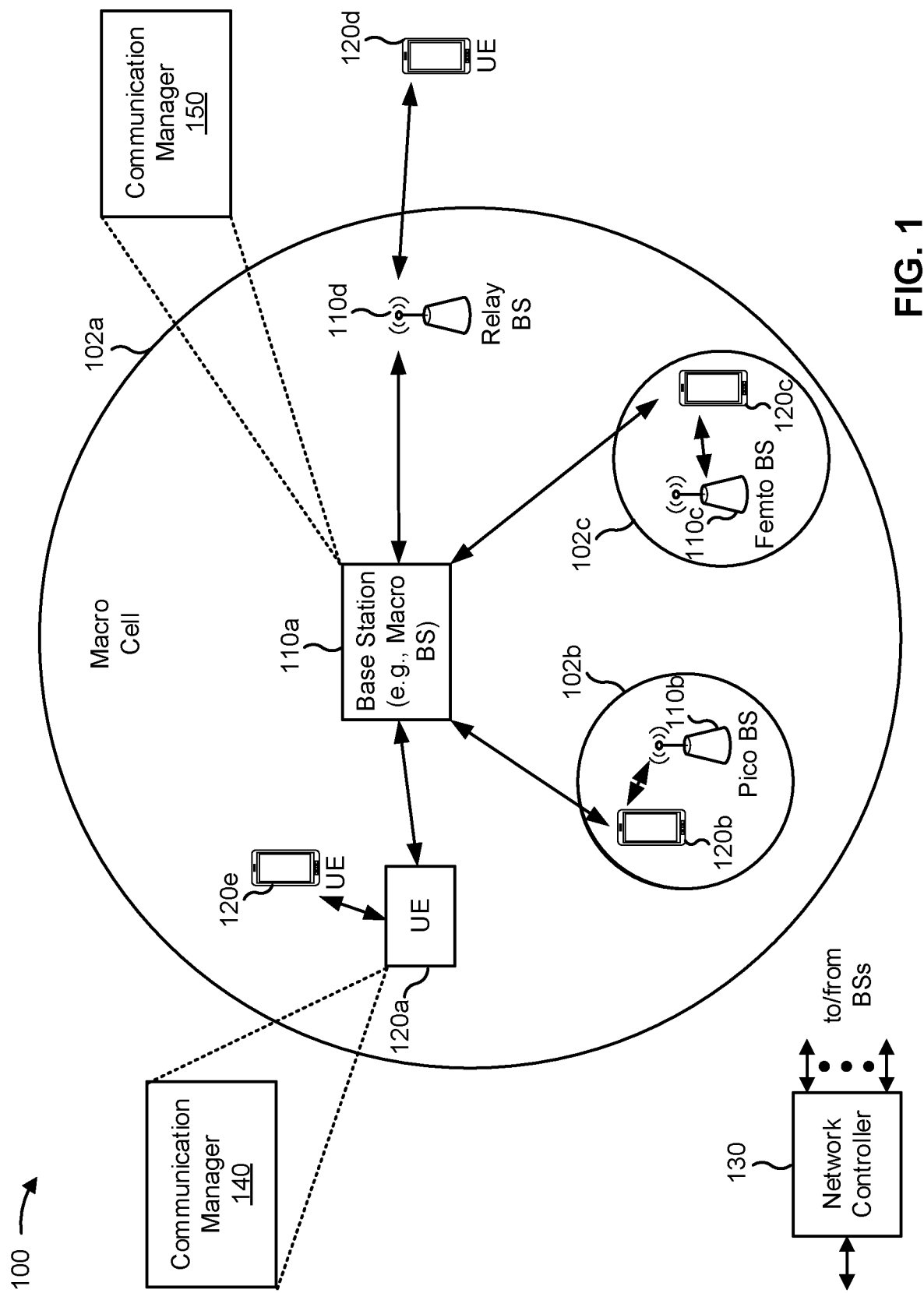
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a BWP hopping configuration indicating a set of hops for a BWP of the UE; identify an RLF during a time period configured by the set of hops; disable the BWP hopping configuration based at least in part on identifying the RLF; and initiate a random access procedure on a BWP that is associated with the random access procedure. Additionally, or alternatively, the communication manager 140 may perform one or more other operations described herein.

In some aspects, the base station 110 may include a communication manager 150. As described in more detail elsewhere herein, the communication manager 150 may transmit a BWP hopping configuration indicating a set of hops for a BWP of a UE; transmit an indication of a BWP, of the UE, to be used for a random access procedure resulting from RLF that occurs during a time period configured by the set of hops; and receive a communication associated with the random access procedure on the BWP to be used for the random access procedure. Additionally, or alternatively, the communication manager 150 may perform one or more other operations described herein.

As indicated above, FIG. 1 is provided as an example. Other examples may differ from what is described with regard to FIG. 1.

Figure 2:
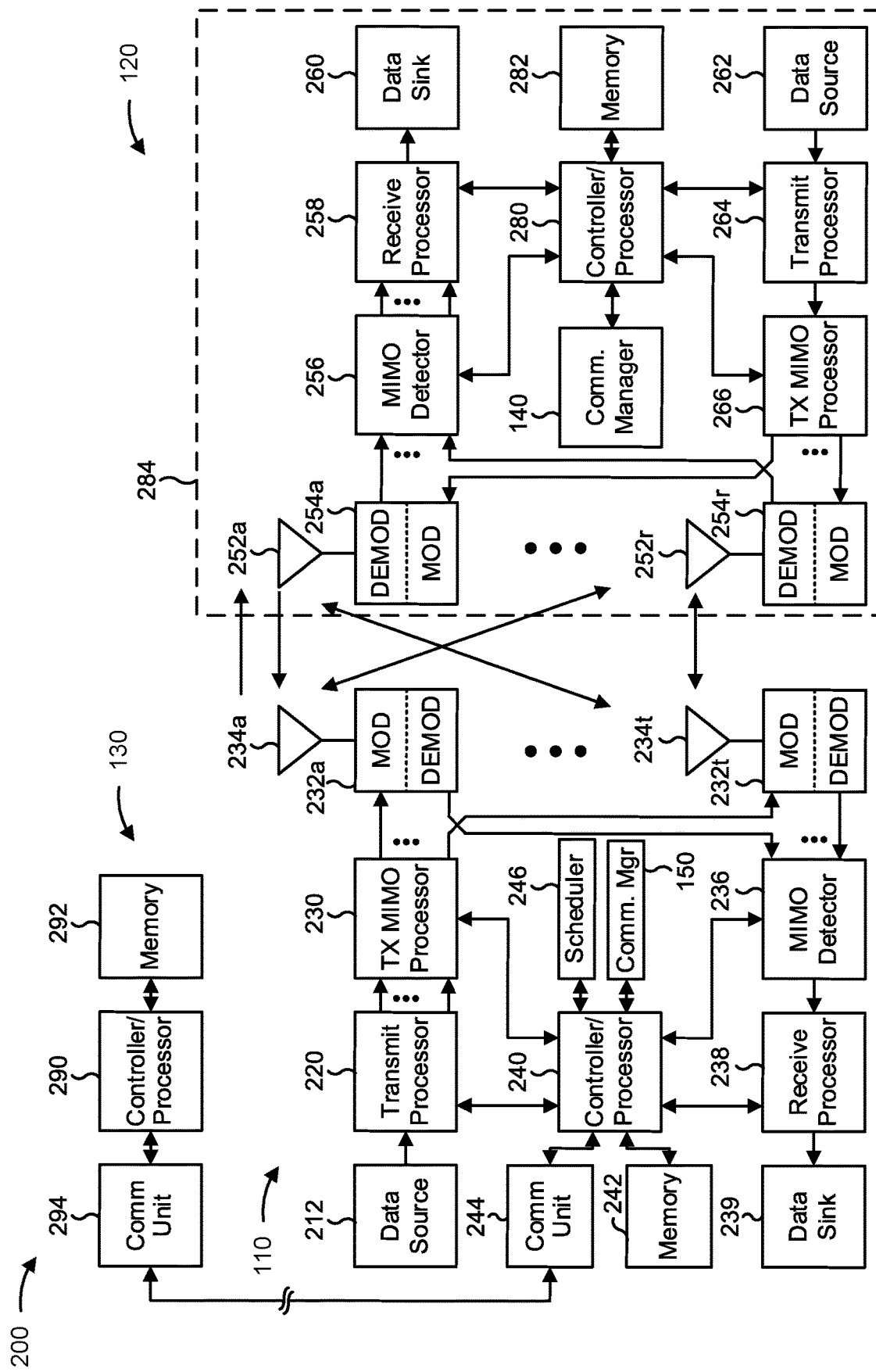
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with radio link failure during bandwidth part hopping, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving a BWP hopping configuration indicating a set of hops for a BWP of the UE; means for identifying an RLF during a time period configured by the set of hops; means for disabling the BWP hopping configuration based at least in part on identifying the RLF; and/or means for initiating a random access procedure on a BWP that is associated with the random access procedure. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a BWP hopping configuration indicating a set of hops for a BWP of a UE; means for transmitting an indication of a BWP, of the UE, to be used for a random access procedure resulting from RLF that occurs during a time period configured by the set of hops; and/or means for receiving a communication associated with the random access procedure on the BWP to be used for the random access procedure. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
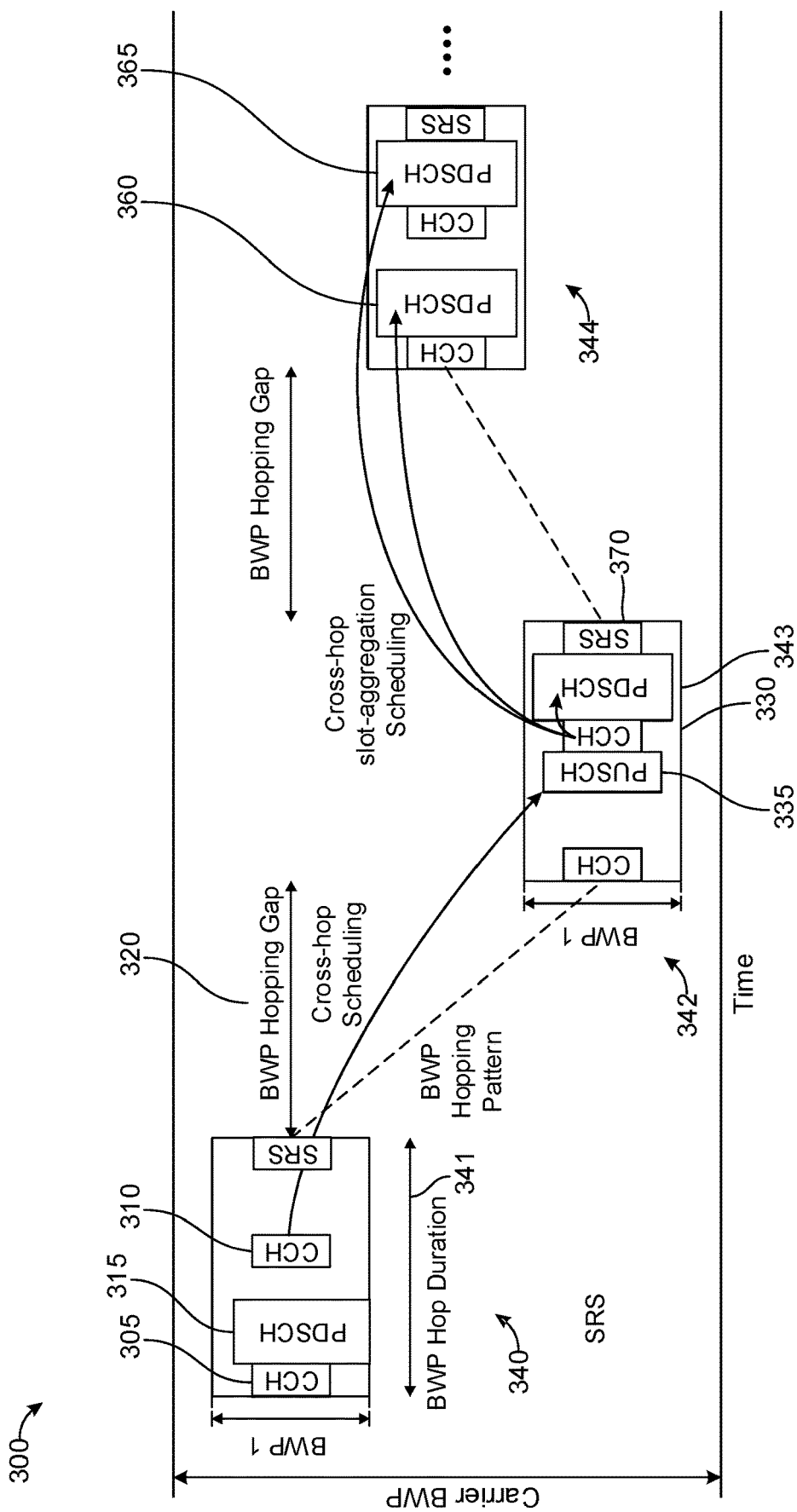
FIG. 3 is a diagram illustrating an example of BWP hopping, in accordance with the present disclosure.

FIG. 3 is a diagram illustrating an example 300 of bandwidth part (BWP) hopping, in accordance with the present disclosure. "BWP hopping" may be referred to herein as "BWP frequency hopping," "frequency hopping" or, simply, "hopping." In some aspects, BWP hopping may be used to improve frequency diversity within a narrow band of operation and to reduce or eliminate frequency-selective interference. For example, intra-BWP hopping may be implemented for a physical uplink control channel (PUCCH) and a physical uplink shared channel (PUSCH) in certain implementations. In some aspects, cross-BWP scheduling for downlink (DL) signaling may be implemented. For example, cross-BWP scheduling may be employed by using control signaling in one BWP to schedule resources in another BWP.

As shown in FIG. 3, a single BWP (e.g., BWP1) may be configured with BWP hopping. BWP1 may have associated configurations, such as configurations for a physical downlink control channel (PDCCH), a physical downlink shared channel (PDSCH), a PUCCH, PUSCH, and reference signals (RS), such as a channel state information (CSI)-RS. For example, control channel (CCH) 305 during BWP hop 340 may be used to configure resources for PDSCH 315 to be received by a UE during BWP hop 340. A BWP that is configured with BWP hopping may have a frequency allocation that varies over time. For example, the frequency allocation may be dependent on a hopping pattern of the BWP, as described below. A BWP that is configured with BWP hopping can be contrasted with a non-hopping BWP, which may have a configured frequency allocation that does not vary over time.

In some aspects, a frequency location of a BWP during each of multiple BWP hops may be determined. For any associated configuration with the BWP, a frequency-domain resource allocation (if any) may be configured with respect to a reference point (e.g., a reference frequency location) within the BWP. The reference point may be the physical resource block (PRB) with the lowest index in the BWP. Regardless of the absolute frequency location of the BWP (e.g., which may be time-varying due to the BWP hopping), the same relative position of resources within the BWP may be maintained. For example, a configuration of CSI-RS and random access channel (RACH) resources may be modified using the corresponding resources' relative position.

In some aspects, the associated procedures for the BWP may be transparent to the BWP hopping. For example, HARQ processes may be maintained across BWP hops (e.g., without dropping of HARQ feedback across BWP hops). In other words, PDSCH 315 may be received by a UE during BWP hop 340, but the acknowledgment for the PDSCH 315 may be transmitted by the UE (e.g., PUCCH) during a different BWP hop (e.g., BWP hop 342).

In some aspects, various timers such as discontinuous reception (DRX) timers, BWP inactivity timers, data inactivity timers, etc. may not be impacted by the BWP hopping. In other words, the timers may continue even though the BWP frequency has changed from one BWP hop to another.

In some aspects, a symbol-wise or slot-wise transition gap may be configured between BWP hops. Slot counting (e.g., scheduling offset) and/or timers may be suspended during the gap between adjacent BWP hops. For example, a BWP hopping gap 320 may exist between BWP hops 340, 342. The BWP hopping gap 320 may be configured to allow time for RF front-end circuitry of the UE to be reconfigured for the new frequency location of the BWP.

In some aspects, BWP hopping may be implemented using a fixed offset. For example, BWP hopping may be from a reference point (e.g., $N_{BWP,0}^{start}$) (e.g., reference frequency location) based at least in part on a predetermined or configured frequency offset $\Delta N_{BWP}$. That is, the frequency location at the $i^{th}$ hop (e.g., i being an integer equal to or greater than 1) may be determined based at least in part on the equation:

$$N_{BWP,i}^{start} = (N_{BWP,0}^{start} + i \cdot \Delta N_{BWP}) \bmod N_{total}$$

where $N_{BWP,i}^{start}$ is the frequency location of the BWP during hop i, $N_{BWP,0}^{start}$ is the frequency location of the reference point (e.g., frequency location of a reference BWP for i=0), $\Delta N_{BWP}$ is the configured fixed frequency offset, and $N_{total}$ is the total number of hops of the BWP.

In some aspects, the BWP hopping may be implemented using a predetermined or configured sequence. For example, the BWP hopping may be calculated from a reference point $N_{BWP,0}^{start}$ based at least in part on a predetermined or configured sequence $\{\Delta N_{BWP,0}, \ldots, \Delta N_{BWP,K-1}\}$. The frequency location at the $i^{th}$ hop may then be determined based at least in part on equation:

$$N_{BWP,i}^{start} = (N_{BWP,0}^{start} + i \cdot \Delta N_{BWP,i}) \bmod N_{total}.$$

In some aspects, additional parameters for the BWP hopping may be configured, such as the BWP hop duration (e.g., BWP hop duration 341 as illustrated in FIG. 3) and the gap between BWP hops (e.g., gap 320 as illustrated in FIG. 3). In some aspects, a UE may report its capability and/or preference on parameters for the BWP hopping to facilitate configuration of the BWP hopping. As used herein, a "BWP hop" refers to a set of time and frequency resources of a BWP during a hop duration. For example, BWP hop 340 includes the BW of BWP1 and a time duration defined by BWP hop duration 341. Thus, a communication in BWP hop 340 may occur within BWP1 and within the BWP hop duration 341.

In some aspects, cross-hop scheduling may be implemented. For example, CCH 310 may be used to configure resources for communication during a different BWP hop, such as the PUSCH 335 during BWP hop 342, as indicated by the arrow from the CCH 310 to the PUSCH 335. In some aspects, cross-hop slot aggregation may be implemented. For example, CCH 330 may allocate resources for PDSCH 343 during BWP hop 342 and resources for PDSCHs 360, 365 that are during BWP hop 344. The PDSCHs 343, 360, 365 may include the same data, or different redundancy versions of the same data, allowing for aggregation of the data for decoding.

In some aspects, cross-hop aperiodic-CSI (A-CSI) triggering may be implemented. For example, during BWP hop 340, the UE may receive control information triggering measurement of CSI-RS (e.g., for A-CSI measurement) and perform the measurement based at least in part on the CSI-RS received during BWP hop 342, and transmit a report of the measurement during BWP hop 344. In some aspects, cross-hop CSI measurement and reporting may be implemented. For example, periodic or semi-persistent CSI measurement and reporting may be configured. Thus, a UE may perform measurement based at least in part on CSI-RS received during BWP hop 340, but transmit a report the measurement during BWP hop 342.

In some cases, cross-hop quasi-co location (QCL) (e.g., QCL-TypeD) may be implemented. For example, by allowing cross-hop CSI measurement and reporting, QCL relationships of signaling (QCL relation of CSI-RS) may be defined across BWP hops. For example, signals communicated via different BWP hops may be quasi-co located with respect to Doppler shift, Doppler spread, average delay, delay spread, and/or spatial parameters.

In some aspects, cross-hop HARQ feedback may be implemented. In other words, HARQ processes may be maintained across BWP hops (e.g., without dropping of HARQ feedback across the BWP hops). For example, PDSCH 315 may be received by a UE during BWP hop 340, but the acknowledgment for the PDSCH 315 may be transmitted by the UE during a different BWP hop (e.g., BWP hop 342).

As shown by reference number 370, the BWP1 may be configured with an SRS. For example, the UE may receive a configuration of an SRS resource. The configuration of the SRS resource may "hop with" the BWP1, meaning that the SRS resource is in the same relative location in each of the BWP hops of example 300. There are situations where the BWP1 may hop to a frequency position where the SRS resource is overlapped with an SRS resource of another UE in a way that degrades orthogonality of SRSs transmitted on the SRS resources. Techniques described herein improve the coexistence of UEs utilizing BWP hopping and UEs using a fixed (e.g., non-frequency-hopping) BWP by configuring one or more SRS resources so that the one or more SRS resources do not interfere with SRS resources of a UE using a fixed BWP.

As indicated above, FIG. 3 is provided as an example. Other examples may differ from what is described with regard to FIG. 3.

Figure 4:
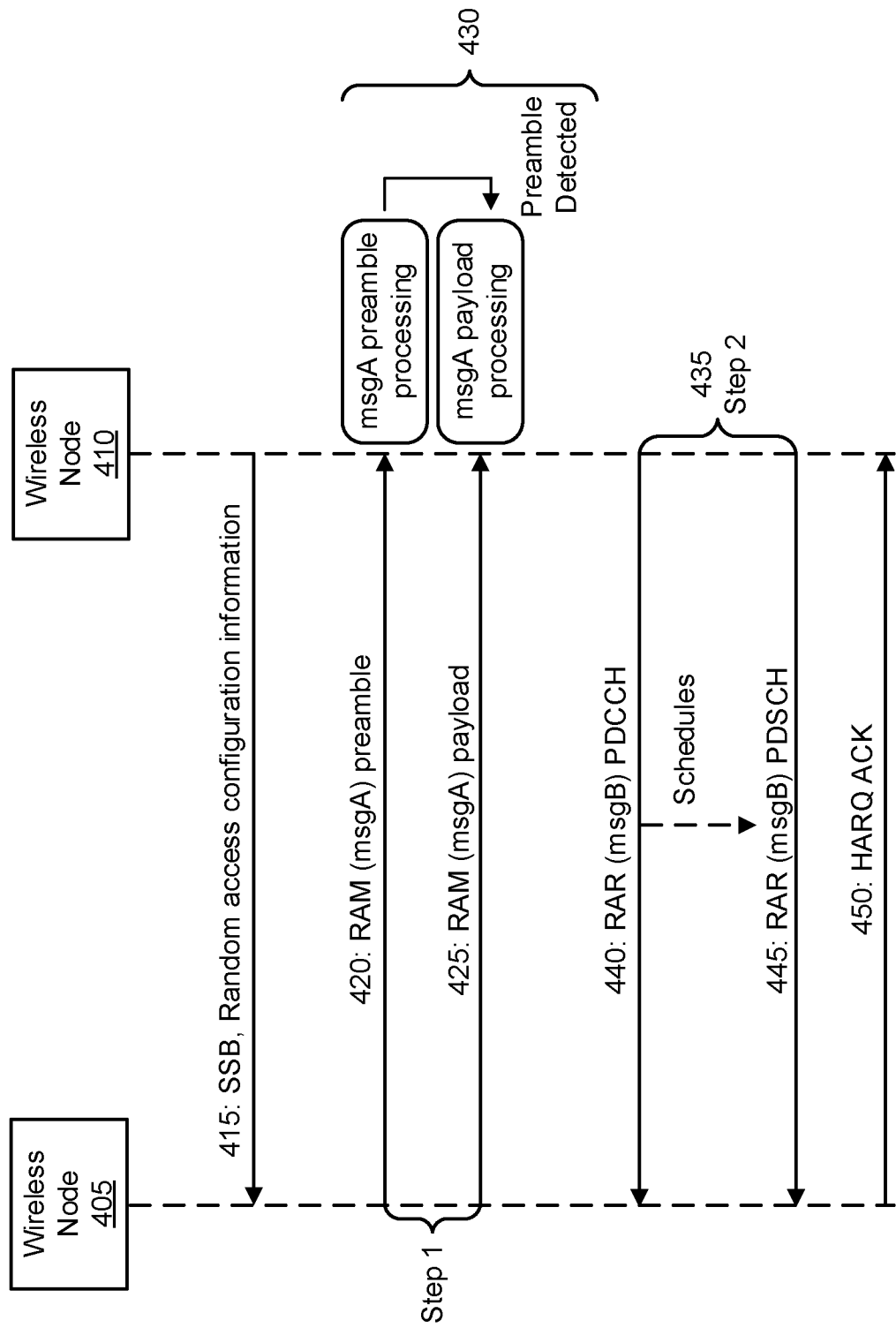
FIG. 4 is a diagram illustrating an example of a random access procedure, in accordance with the present disclosure.

FIG. 4 is a diagram illustrating an example 400 of a random access procedure, in accordance with the present disclosure. In some aspects, the random access procedure may include a random access resource selection procedure.

As shown in FIG. 4, a wireless node 405 (which may include UE 120, BS 110, a relay node, a TRP, a sidelink device, or another device) and a wireless node 410 (which may include UE 120, BS 110, a relay node, a TRP, a sidelink device, or another device) may communicate with one another to perform the four-step random access procedure. In one example, the wireless node 405 may be a UE such as the UE 120 and the wireless node 410 may be a base station such as the BS 110.

As shown by reference number 415, the wireless node 410 may transmit, and the wireless node 405 may receive, one or more one or more synchronization signal blocks (SSBs) and random access configuration information. In some aspects, the random access configuration information may be transmitted in or indicated by system information (such as in one or more system information blocks (SIBs)) or an SSB, such as for contention-based random access. Additionally, or alternatively, the random access configuration information may be transmitted in a radio resource control (RRC) message or a physical downlink control channel (PDCCH) order message that triggers a random access procedure, such as for contention-free random access. The random access configuration information may include one or more parameters to be used in the random access procedure, such as one or more parameters for transmitting a random access message (RAM) or one or more parameters for receiving a random access reply (RAR).

As shown by reference number 420, the wireless node 405 may transmit a RAM, which may include a preamble (sometimes referred to as a random access preamble, a PRACH preamble, or a RAM preamble). The message that includes the preamble may be referred to as a RACH message 1, msg1, MSG1, a first message, or an initial message in a four-step random access procedure. The random access message may include a random access preamble identifier.

In some aspects, the random access procedure may be a contention-based random access procedure or a contention-free random access procedure. In contention-based random access, the wireless node 405 may randomly select a random access preamble from a pool of preambles shared with other UEs (e.g., wireless nodes) in the cell. In contrast, in contention-free random access, the wireless node 405 may use a dedicated preamble provided by the network specifically to the network node 405 (e.g., via RRC signaling).

As shown by reference number 425, the wireless node 410 may transmit an RAR as a reply to the preamble. The message that includes the RAR may be referred to as RACH message 2, msg2, MSG2, or a second message in a four-step random access procedure. In some aspects, the RAR may indicate the detected random access preamble identifier (such as received from the wireless node 405 in msg1). Additionally, or alternatively, the RAR may indicate a resource allocation to be used by the wireless node 405 to transmit message 3 (msg3).

In some aspects, as part of the second step of the four-step random access procedure, the wireless node 410 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step random access procedure, the wireless node 410 may transmit the PDSCH communication for the RAR, as scheduled by the PDCCH communication. The RAR may be included in a MAC PDU of the PDSCH communication.

As shown by reference number 430, the wireless node 405 may transmit an RRC connection request message. The RRC connection request message may be referred to as RACH message 3, msg3, MSG3, or a third message of a four-step random access procedure. In some aspects, the RRC connection request may include a UE identifier, UCI, or a PUSCH communication (such as an RRC connection request).

As shown by reference number 435, the wireless node 410 may transmit an RRC connection setup message. The RRC connection setup message may be referred to as RACH message 4, msg4, MSG4, or a fourth message of a four-step random access procedure. In some aspects, the RRC connection setup message may include the detected UE identifier, a timing advance value, or contention resolution information. As shown by reference number 430, if the wireless node 405 successfully receives the RRC connection setup message, the wireless node 405 may transmit a HARQ ACK.

The random access procedure may be used by the UE 120 to reestablish a radio link, such as after identifying radio link failure. Techniques described herein enable the wireless node 405 to initiate the random access procedure (e.g., to perform random access resource selection and/or to transmit a RAM) on a selected BWP, which may be beneficial if the wireless node 405 is configured with BWP hopping, as described in more detail below.

While example 400 pertains to four-step random access, the techniques described herein can also be implemented for two-step random access. In two-step random access, RACH message 1 and RACH message 3 are consolidated into a single RACH message (referred to as RACH message A) and RACH message 2 and RACH message 4 are consolidated into another single RACH message (referred to as RACH message B).

As indicated above, FIG. 4 is provided as an example. Other examples may differ from what is described with regard to FIG. 4.

Figure 5:
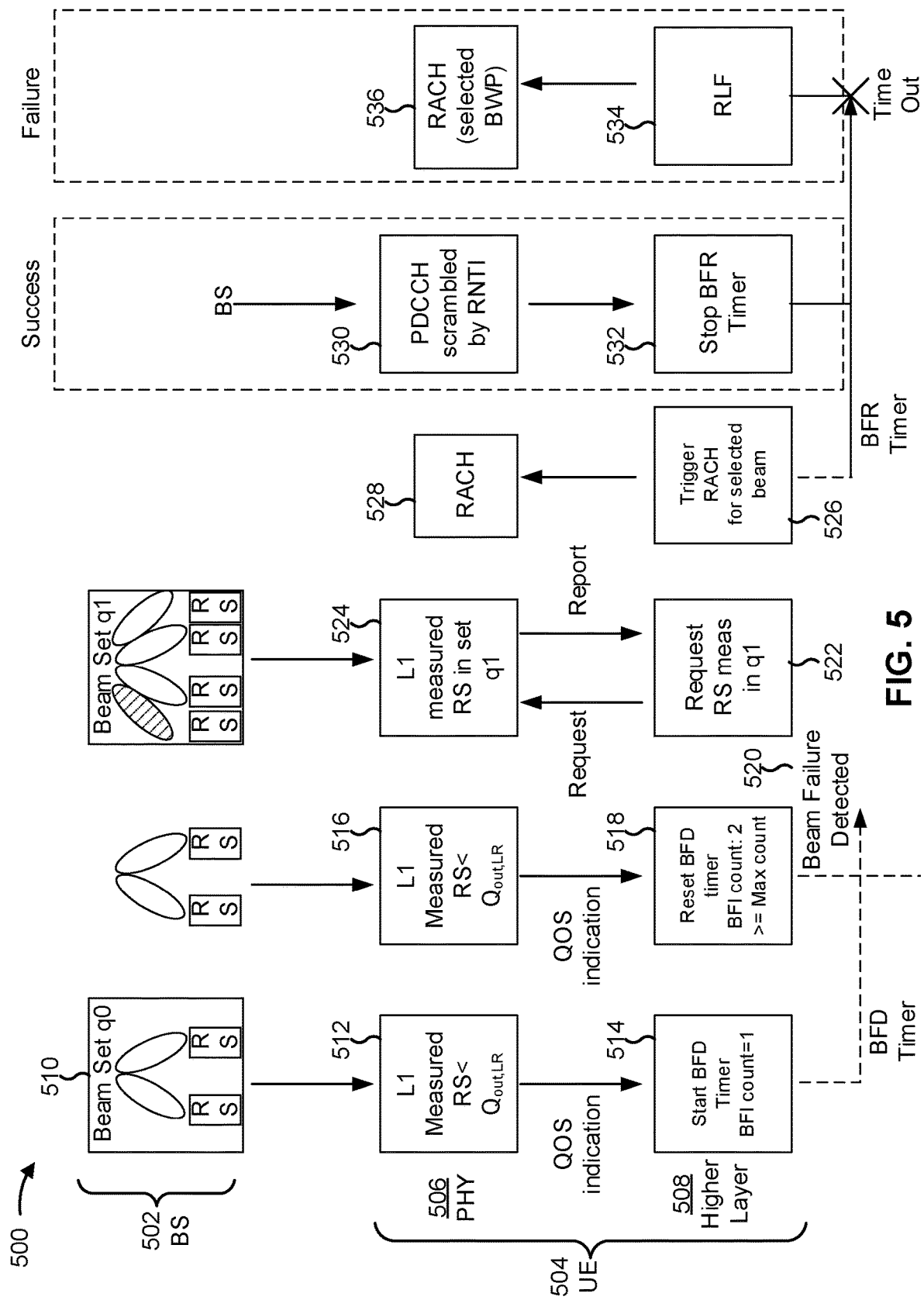
FIG. 5 is a diagram illustrating an example of beam failure detection and beam failure recovery, in accordance with the present disclosure.

FIG. 5 is a diagram illustrating an example 500 of beam failure detection and beam failure recovery, in accordance with various aspects of the present disclosure. In some aspects, a UE (e.g., UE 120) may monitor reference signals transmitted by a base station (e.g., base station 110) to detect beam failure. Beam failure may occur due to changing channel conditions, obstacles, distance from the base station transmitting the beam, interference, and/or the like. When a reference signal of a first set of beams fails to satisfy a threshold (e.g., a Qout threshold and/or the like) on a particular number of monitoring occasions, the UE may identify a beam failure. The UE may perform a beam recovery procedure upon detecting a beam failure. The reference signals monitored by the UE may be transmitted on a control channel, which may be identified by a control resource set (CORESET). A particular CORESET may also be associated with configuration information for monitoring the reference signals, such as thresholds for declaring beam failure and/or identifying a candidate beam, a block error rate (BLER) associated with the thresholds, and/or the like.

Example 500 includes operations performed by the base station (e.g., BS 110) and operations performed by a UE (e.g., UE 120). Operations performed by the base station are shown in the top part of FIG. 5, as shown by reference number 502. Operations performed by the UE are shown in the bottom part of FIG. 5, as shown by reference number 504. Each operation is indicated by a box, and arrows indicate a direction of an indication, a transmission, and/or the like. Actions of the UE that are performed by a physical (PHY) layer of the UE are shown in the row indicated by reference number 506, and actions of the UE that are performed by a higher layer (e.g., medium access control (MAC), radio link control (RLC), packet data convergence protocol (PDCP), radio resource control (RRC), non access stratum (NAS), Internet Protocol (IP), and/or the like) are shown in the row indicated by reference number 508.

As shown by reference number 510, the base station may transmit a beam set q0. The beam set q0 may include one or more beams that are each associated with a corresponding reference signal (RS). The reference signal may include a synchronization signal block (SSB), a channel state information (CSI) RS (CSI-RS), and/or the like. In some aspects, the base station may transmit the beam set q0 based at least in part on a failure detection CORESET, such as a half-duplex failure detection CORESET or a full duplex failure detection CORESET. For example, the base station may select the beams of the beam set q0 and/or control channels on which the respective reference signals of the beams are to be transmitted, based at least in part on the failure detection CORESET.

As shown by reference number 512, the UE may perform a Layer 1 (L1) measurement of the reference signals of the beam set q0. For example, the UE may determine a measurement regarding each reference signal of the beam set q0. The measurement may include a reference signal received power, a reference signal received quality, a signal to interference and noise ratio, and/or the like. As further shown, the UE (e.g., the PHY layer) may determine that the L1 measurement fails to satisfy a first threshold, referred to as Qout. Qout may be defined based at least in part on the level at which the downlink radio link cannot be reliably received, indicating that the UE is out of sync with the base station. In some aspects, Qout may be based at least in part on an out-of-sync block error rate ($BLER_{out}$). As shown, the UE (e.g., the physical layer) may provide a quality of service (QoS) indication to a higher layer of the UE.

As shown by reference number 514, the UE (e.g., the higher layer) may start a beam failure detection (BFD) timer based at least in part on the failure of the beams to satisfy Qout and may increment a beam failure indication (BFI) count. If the BFI count satisfies a threshold (shown as max count in connection with reference number 518) before the expiration of the BFD timer, then the UE may determine beam failure. If the BFD timer expires before the BFI count satisfies the threshold, then the UE may reset the BFI count, thereby not determining a beam failure.

As shown by reference number 516, the UE (e.g., the PHY layer) may perform a second L1 measurement of the reference signals of the beam set q0. As further shown, the UE may provide a QoS indication to the higher layer of the UE indicating that the second L1 measurement fails to satisfy Qout. If the second L1 measurement had satisfied Qout, then the BFD timer may expire and the UE may not identify beam failure.

As shown by reference number 518, the UE may reset the BFD timer based at least in part on the second L1 measurement failing to satisfy the threshold and may increment the BFI count. As further shown, the BFI count now satisfies the maximum count threshold. Accordingly, as shown by reference number 520, the UE determines that beam failure is detected.

As shown by reference number 522, the UE (e.g., the higher layer) may request measurement of reference signals on a beam set q1 to identify one or more beams of the beam set q1 that satisfy a second threshold (e.g., Qin, sometimes referred to herein as a beam failure recovery threshold). For example, the beam set q1 may be a set of candidate beams for the beam failure recovery procedure. Qin may be defined based at least in part on a level at which the downlink radio quality can be significantly more reliably received than at Qout. In some aspects, Qin may be based at least in part on an in-sync block error rate ($BLER_{in}$). In some aspects, Qin may be based at least in part on an uplink transmission parameter, as described in more detail elsewhere herein.

As shown by reference number 524, the UE 120 (e.g., the PHY layer) may provide measurement information identifying L1 measurements of reference signals of the beam set q1. In example 500, the measurement information indicates that a particular reference signal associated with a particular beam satisfies Qin. In FIG. 5, the particular beam is illustrated by diagonal hatching. If the measurement information indicates that the particular reference signal associated with the particular beam satisfies Qin, the UE 120 may select the particular beam as a selected beam and may attempt to access the selected beam or a cell associated with the selected beam. For example, as shown by reference number 526, the UE (e.g., the higher layer) may trigger a random access channel (RACH) procedure to access the selected beam, and, as shown by reference number 528, the UE (e.g., the PHY layer) may perform the RACH procedure. For example, the UE may provide a RACH Message 1 (e.g., a first message of a RACH procedure) to the base station to access the selected beam.

In the case wherein the RACH procedure is successful, the BS may provide a physical downlink control channel (PDCCH) on the selected beam, as shown by reference number 530. In some aspects, this response may be a response to the RACH Message 1, such as a RACH Message 2, and/or the like. As further shown, the PDCCH may be scrambled using a radio network temporary identifier (RNTI) (e.g., a cell-specific RNTI or another type of RNTI). As shown by reference number 532, the UE may stop the BFD timer based at least in part on the beam failure recovery being successful.

In the case wherein the RACH procedure is unsuccessful, the UE may determine radio link failure (RLF) after expiration of a beam failure recovery timer, as shown by reference number 534. In such a case, the UE may enter an idle mode, may report the radio link failure, may search for a new cell, and/or the like.

As described herein, a UE may determine that a communication using a set of beams has failed, for example, due to changing channel conditions, an obstacle, distance from the base station transmitting the beam, interference, and/or the like. When a reference signal of a first set of beams fails to satisfy a threshold on a particular number of monitoring occasions, the UE may identify a beam failure. Based at least in part on identifying the beam failure, the UE may implement a beam failure recovery procedure and may activate a beam failure recovery timer. If the beam failure recovery procedure is not successful prior to the expiration of the beam failure recovery timer, a radio link failure is determined to have occurred between the UE and the base station. For example, the UE may determine that a radio link failure has occurred during a time period spanned by a set of hops associated with the BWP hopping configuration of the UE (e.g., during any time period in which the UE is operating according to the BWP hopping configuration).

The UE may implement a random access procedure based at least in part on the failure of the beam failure recovery in order to notify the base station of the radio link failure and to reestablish the radio link (e.g., identify a new beam pair for communicating with the base station). However, the random access procedure may be made more complex when the UE is performing BWP hopping according to a BWP hopping configuration.

First, the UE may not be capable of performing the random access procedure on each of the BWP hops of the BWP hopping configuration. For example, the UE may be hopping between a number of different frequency positions (e.g., twenty frequency positions) corresponding to different hops of a BWP in accordance with the BWP hopping configuration. At least some (e.g., most) of those BWP hops may not support the random access procedure, since reserving the number of resources required for the performance of the random access procedure in all of the BWP hops would be inefficient. In order to locate a BWP that does support the random access procedure, the UE may continue to BWP hop in accordance with the BWP hopping configuration, or may determine that the random access procedure has failed. This may result in delays in the random access procedure (e.g., as a result of BWP switching or hopping gaps) and a possible failure of the random access procedure.

Second, the UE may fall out of synchronization (out of synch) with the base station based at least in part on the occurrence of the radio link failure. In some aspects, the UE may be configured to follow certain rules related to the BWP hopping configuration, such as synchronization signal/ physical broadcast channel (SS/PBCH) block measurement timing configurations (SMTC), search space periods, and/or semi-persistent scheduling (SPS) periods, which may no longer be possible to follow once a radio link failure has occurred. The random access procedure may be difficult (or impossible) to implement if the base station is unaware of the current BWP hopping location of the UE, and thus, the UE and the base station may remain out of synch.

Techniques and apparatuses described herein enable the UE to implement the random access procedure while the UE is performing BWP hopping according to the BWP hopping configuration. For example, the UE may identify (e.g., determine) that a radio link failure has occurred during a time period spanned by a set of hops associated with the BWP hopping configuration of the UE. The UE, based at least in part on identifying the radio link failure, may disable the BWP hopping configuration of the UE. The UE may perform random access resource selection and transmit a RAM on a selected BWP, as shown by reference number 536.

In some aspects, the UE may switch to a default BWP (e.g., an anchor BWP) prior to disabling the BWP hopping configuration of the UE. In some aspects, the UE may disable the BWP hopping configuration of the UE while remaining on a most recent hop of the BWP hopping configuration of the UE (e.g., without switching from a BWP associated with the BWP hopping configuration). The UE may initiate a random access procedure, such as a random access resource selection procedure, on the selected BWP in order to notify the base station of the radio link failure and/or recover from the radio link failure.

The above described techniques and apparatuses enable a UE to implement the random access procedure while the UE is performing BWP hopping. In some aspects, disabling the BWP hopping configuration prior to initiating the random access procedure results in a number of benefits.

First, only a portion of the hops (e.g., one hop) of the BWP hopping configuration may need to be configured with the resources to perform the random access procedure. In some aspects, once a radio link failure has been determined, the UE may switch to a hop of the BWP hopping configuration that is configured with the resources for the random access procedure. In some aspects, the UE may perform the random access procedure on a most recent hop of the BWP hopping configuration (e.g., based at least in part on information from the base station that the most recent hop supports the random access procedure). The UE may thereafter disable the BWP hopping configuration and may initiate the random access procedure using the most recent hop of the BWP hopping configuration. In some other aspects, the UE may switch to an anchor or default BWP that is configured with resources for the random access procedure. Since only a portion of the BWP hops, or the anchor or default BWP, are configured with the resources to perform the random access procedure, the number of resources set aside to perform the random access procedure is reduced, and therefore less bandwidth is required.

Second, disabling the BWP hopping configuration reduces the likelihood of delays caused by BWP hopping. Since the base station is aware of the location of the most recent hop of the BWP hopping configuration, and since the UE will not continue to hop after the BWP hopping configuration has been disabled, the UE and the base station will remain in synch. Thus, the likelihood of success of the random access procedure is increased. Further, UE resources (e.g., processor, memory, transmission, etc.) that would otherwise be used in reperforming the random access procedure may be allocated elsewhere.

As indicated above, FIG. 5 is provided as an example. Other examples may differ from what is described with regard to FIG. 5.

Figure 6:
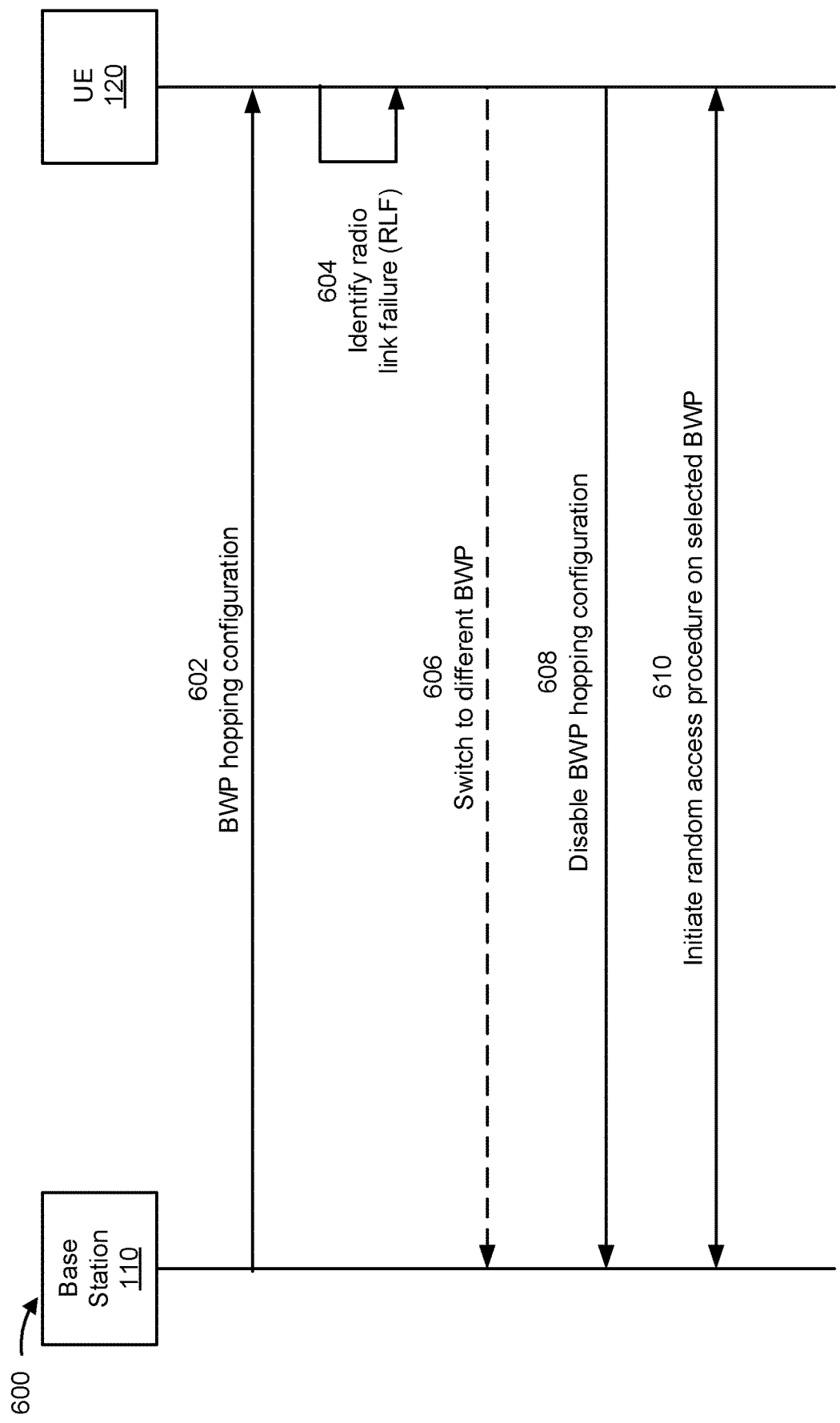
FIG. 6 is a diagram illustrating an example associated with radio link failure during bandwidth part hopping, in accordance with the present disclosure.

FIG. 6 is a diagram illustrating an example 600 of radio link failure recovery during BWP hopping, in accordance with the present disclosure.

As shown in connection with reference number 602, the base station 110 may transmit, and the UE 120 may receive, a BWP hopping configuration indicating a set of hops for a BWP of the UE. BWP hopping may be used to improve frequency diversity within a narrow band of operation and to reduce or eliminate frequency-selective interference. In some aspects, a BWP that is configured with BWP hopping may have associated configurations, such as configurations for a PDCCH, PDSCH, PUCCH, PUSCH, and RS (such as CSI-RS). A BWP that is configured with BWP hopping may have a frequency allocation that varies over time. For example, the frequency allocation may be dependent on a hopping pattern of the BWP. A BWP that is configured with BWP hopping can be contrasted with a non-hopping BWP, which may have a configured frequency allocation that does not vary over time.

In some aspects, the BWP hopping configuration may include information associated with a random access procedure. For example, the BWP hopping configuration may indicate a default (e.g., anchor) BWP of the BWP hopping configuration that supports the random access procedure. In other words, the BWP hopping configuration may indicate one or more hops of the BWP hopping configuration that are configured with certain resources to perform the random access procedure. In some aspects, the BWP hopping configuration may indicate that the UE 120, based at least in part on initiating a random access procedure or declaring radio link failure, should switch to the default BWP of the BWP hopping configuration. In some other aspects, the BWP hopping configuration may indicate that the UE 120, based at least in part on initiating the random access procedure or declaring radio link failure, should stay on a most recent BWP (e.g., a most recent hop) of the BWP hopping configuration. Thus, the base station 110 may explicitly indicate the BWP on which to initiate the random access procedure. As used herein, a "most recent hop" (or "most recent BWP") may refer to a hop (or BWP) in which radio link failure is declared.

In some aspects, the BWP hopping configuration may include one or more rules for determining a BWP on which to initiate the random access procedure. Thus, the base station 110 may implicitly indicate the BWP on which to initiate the random access procedure. For example, the one or more rules may indicate one or more characteristics of a BWP, such as whether that BWP is configured with the resources for performing the random access procedure.

As shown in connection with reference number 604, the UE 120 may identify (e.g., determine, declare) a radio link failure, such as described above in connection with FIG. 5. The UE 120 may identify the radio link failure during a time period configured by the set of hops in the BWP hopping configuration. For example, the UE 120 may determine that a radio link failure has occurred during any time period in which the UE is operating according to the BWP hopping configuration, such as during a BWP hop or in between switching from one BWP hop to another BWP hop.

In some aspects, the UE 120 may identify that a beam failure has occurred, for example, due to changing channel conditions, obstacles, distance from the base station transmitting the beam, interference, and/or the like. Based at least in part on identifying the beam failure, the UE 120 may implement a beam failure recovery procedure (e.g., a RACH procedure) and may activate a beam failure recovery timer. If the beam failure recovery procedure is not successful prior to the expiration of the beam failure recovery timer, the UE 120 may determine that a radio link failure has occurred between the UE 120 and the base station 110, and in such a case, the UE 120 may enter an idle mode, may report the radio link failure, may search for a new cell, and/or the like.

As shown in connection with reference number 606, in some aspects, the UE 120 may switch to a different BWP. In some aspects, the UE 120 may switch to the default BWP (e.g., the anchor BWP). In some aspects, the default BWP may be indicated in a pre-configuration, such as in the BWP hopping configuration described in connection with reference number 602. In some aspects, switching to the different BWP may include switching to a selected BWP that is associated with a random access procedure, such as the random access procedure described in connection with reference number 610. In some aspects, the UE may remain on a BWP associated with the BWP hopping configuration (e.g., may move to a prior hop of the BWP hopping configuration such as a most recent hop before the radio link failure), as described in more detail below.

In some aspects, switching to the different BWP may include switching to a BWP that has a bandwidth that is included in a bandwidth of a hop of the set of hops indicated in the BWP hopping configuration. As described above in the example of FIG. 3, the BWP hopping configuration associated with UE 120 may include three BWP hops (340, 342, 344). If the UE 120 is currently using BWP hop 342 of the BWP hopping configuration, the UE 120 may switch (e.g., hop) to BWP hop 340 or BWP hop 344 of the BWP hopping configuration. The UE 120 may switch to the BWP that has a bandwidth that is included in a bandwidth of a hop of the set of hops indicated in the BWP hopping configuration based at least in part on an indication that the BWP hop supports the random access procedure. In some aspects, the BWP that has a bandwidth that is included in a bandwidth of a hop of the set of hops may be a separate BWP than the BWP of the BWP hopping configuration. For example, the UE 120 may be configured with a first BWP for BWP hopping (associated with the BWP hopping configuration) and a second BWP that has a bandwidth overlapping or included in the bandwidth of a hop of the first BWP. In this example, the second BWP may have random access resources for the random access procedure.

In some aspects, switching to the different BWP may include switching to a BWP that has a bandwidth that is not included in a bandwidth of any hop of the set of hops indicated in the BWP hopping configuration. For example, if the UE 120 is currently using BWP hop 342 of the BWP hopping configuration, the UE 120 may switch (e.g., hop) to another set of frequencies that do not correspond to BWP hop 340 or BWP hop 344 of the BWP hopping configuration. The UE 120 may switch to the BWP that has a bandwidth that is not included in a bandwidth of any hop of the set of hops indicated in the BWP hopping configuration based at least in part on an indication that the BWP supports random access resource selection. In some aspects, this BWP may be the default (e.g., anchor) BWP.

As shown in connection with reference number 608, the UE 120 may transmit, and the base station 110 may receive, an indication to disable the BWP hopping configuration. The indication to disable the BWP hopping configuration may be based at least in part on identifying the radio link failure. In some aspects, the UE 120 may stop BWP hopping according to the BWP hopping configuration prior to transmitting the indication to disable the BWP hopping configuration. In some aspects, the UE 120 may stop BWP hopping according to the BWP hopping configuration based at least in part on transmitting the indication to disable the BWP hopping configuration (e.g., after transmitting the indication to disable the BWP hopping configuration). In some aspects, the UE 120 may disable the BWP hopping configuration without transmitting the indication to disable the BWP hopping configuration. As used herein, "disabling a BWP hopping configuration" may refer to ceasing BWP hopping in accordance with the BWP hopping configuration.

In some aspects, the UE 120 may transmit the indication to disable the BWP hopping configuration after the UE 120 has switched to the different BWP, such as the default BWP. Alternatively, the UE 120 may transmit the indication to disable the BWP hopping configuration before the UE 120 has switched to the selected BWP, or simultaneously with the UE 120 switching to the selected BWP. In some aspects, the UE 120 may transmit the indication to disable the BWP hopping configuration on a most recent hop of the BWP hopping configuration. Transmitting the indication to disable the BWP hopping configuration may enable the base station 110 to keep track of which BWP hop the UE 120 is currently occupying. For example, the base station 110 may be aware of the bandwidth corresponding to the default BWP and/or may be aware of the bandwidth corresponding to the most recent BWP of the BWP hopping configuration.

As shown in connection with reference number 610, the UE 120 may initiate a random access procedure. For example, the UE may perform a random access resource selection procedure. The random access procedure may be initiated on a selected BWP of the BWP hopping configuration. The random access procedure may be a contention-based random access procedure or a contention-free random access procedure. In contention-based random access, the UE 120 may randomly select a random access preamble from a pool of preambles shared with other UEs in the cell. In contrast, in contention-free random access, the UE 120 may use a dedicated preamble provided by the network specifically to the UE 120 (e.g., via RRC signaling).

The random access procedure may be initiated on a BWP that is configured with one or more resources for performing the random access procedure. In some aspects, the random access procedure may be initiated after the UE 120 has switched to the BWP (e.g., the default BWP) that is configured with one or more resources for performing the random access procedure. In some aspects, the random access procedure may be initiated on a most recent hop of the BWP hopping configuration. In other words, the UE 120 may not switch to another BWP (e.g., the default BWP) prior to initiating the random access procedure. By initiating the random access procedure on the BWP that is configured with the one or more resources for performing the random access procedure, efficiency of resource allocation can be improved by reducing the number of resources that have to be allocated for random access (from one or more resources on every hop of the BWP hopping configuration to the one or more resources on the BWP).

The UE 120 may be configured to determine on which BWP to initiate the random access procedure. In some aspects, the UE 120 may receive an indication (e.g., an explicit indication) to use a particular BWP for initiating the random access procedure. For example, the base station 110 may send, to the UE 120, an indication to use the most recent BWP of the BWP hopping configuration to initiate the random access procedure, or to switch to a different BWP (e.g., the default BWP) to initiate the random access procedure. In some aspects, the UE 120 may determine (e.g., implicitly) the BWP to use for initiating the random access procedure based at least in part on one or more rules. For example, the one or more rules may indicate to use the most recent BWP of the BWP hopping configuration to initiate the random access procedure, or to switch to a different BWP (e.g., the default BWP) to initiate the random access procedure, based at least in part on one or more characteristics of the BWP (e.g., if the beam failure recovery parameters are missing from all other BWPs and only exist on the default BWP). The one or more rules may be received from the base station 110, may be indicated in the BWP hopping configuration, and/or may be indicated in information associated with one or more of the BWP hops.

In some aspects, the UE 120 may activate one or more timers. The one or more timers may be activated based at least in part on switching to the selected BWP. The one or more timers may include a random access channel back-off timer. The one or more timers may be activated after the switching to the selected BWP is complete. Activating the one or more timers after the switching to the selected BWP is complete may give the UE 120 and the base station 110 more time to establish a connection than if the one or more timers had been activated prior to the UE 120 switching to the selected BWP.

As described above, in some aspects, the UE 120 may switch to a different BWP (e.g., the default BWP), and may disable the BWP frequency hopping configuration, prior to initiating the random access procedure. In some aspects, the UE 120 may disable the BWP frequency hopping configuration, and may thereafter initiate the random access procedure (e.g., in the bandwidth of the most recent hop of the BWP hopping configuration). Since only a portion of the BWP hops are configured with the resources to perform the random access procedure, the number of resources set aside to perform the random access procedure may be reduced, and therefore less bandwidth may be required. Further, disabling the BWP hopping configuration reduces the likelihood of delays caused by BWP hopping and increases the likelihood of success of the random access procedure.

As indicated above, FIG. 6 is provided as an example. Other examples may differ from what is described with regard to FIG. 6.

Figure 7:
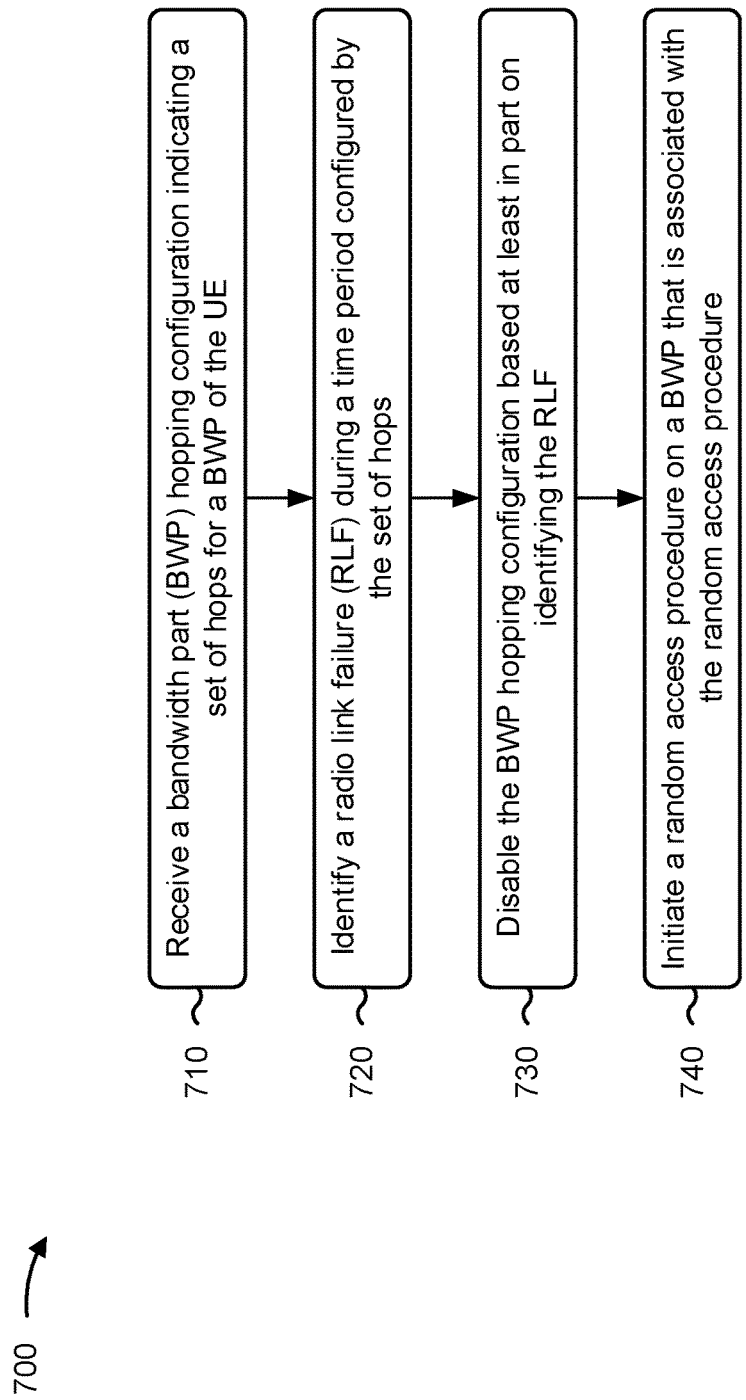
FIG. 7 is a diagram illustrating an example process associated with radio link failure during BWP hopping, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for radio link failure recovery during.

As shown in FIG. 7, in some aspects, process 700 may include receiving a BWP hopping configuration indicating a set of hops for a BWP of the UE (block 710). For example, the UE (e.g., using communication manager 140 and/or reception component 902, depicted in FIG. 9) may receive a BWP hopping configuration indicating a set of hops for a BWP of the UE, as described above.

As further shown in FIG. 7, in some aspects, process 700 may include identifying a RLF during a time period configured by the set of hops (block 720). For example, the UE (e.g., using communication manager 140 and/or identification component 908, depicted in FIG. 9) may identify a RLF during a time period configured by the set of hops, as described above.

As further shown in FIG. 7, in some aspects, process 700 may include disabling the BWP hopping configuration based at least in part on identifying the RLF (block 730). For example, the UE (e.g., using communication manager 140 and/or configuration component 910, depicted in FIG. 9) may disable the BWP hopping configuration based at least in part on identifying the RLF, as described above.

As further shown in FIG. 7, in some aspects, process 700 may include initiating a random access procedure on a BWP that is associated with the random access procedure (block 740). For example, the UE (e.g., using communication manager 140 and/or initiation component 912, depicted in FIG. 9) may initiate a random access procedure on a BWP that is associated with the random access procedure, as described above.

Process 700 may include additional aspects, such as any single aspect or any combination of aspects described below and/or in connection with one or more other processes described elsewhere herein.

In a first aspect, initiating the random access procedure comprises performing random access resource selection.

In a second aspect, alone or in combination with the first aspect, process 700 includes switching to the BWP that is associated with the random access procedure.

In a third aspect, alone or in combination with one or more of the first and second aspects, the BWP that is associated with the random access procedure has a bandwidth that is included in a bandwidth of a hop of the set of hops indicated in the BWP hopping configuration.

In a fourth aspect, alone or in combination with one or more of the first through third aspects, the BWP that is associated with the random access procedure has a bandwidth that is not included in a bandwidth of any hop of the set of hops indicated in the BWP hopping configuration.

In a fifth aspect, alone or in combination with one or more of the first through fourth aspects, the BWP that is associated with the random access procedure comprises one of a default BWP or an anchor BWP indicated by a pre-configuration.

In a sixth aspect, alone or in combination with one or more of the first through fifth aspects, process 700 includes activating, after switching to the BWP that is associated with the random access procedure, a timer.

In a seventh aspect, alone or in combination with one or more of the first through sixth aspects, the timer comprises a random access channel back-off timer.

In an eighth aspect, alone or in combination with one or more of the first through seventh aspects, switching to the BWP that is associated with the random access procedure comprises switching, prior to disabling the BWP hopping configuration, to the BWP that is associated with the random access procedure.

In a ninth aspect, alone or in combination with one or more of the first through eighth aspects, the BWP that is associated with the random access procedure is the BWP associated with the BWP hopping configuration.

In a tenth aspect, alone or in combination with one or more of the first through ninth aspects, the random access procedure is initiated in a bandwidth of a most recent hop of the BWP hopping configuration.

In an eleventh aspect, alone or in combination with one or more of the first through tenth aspects, process 700 includes receiving an indication of whether the BWP that is associated with the random access procedure is the BWP associated with the BWP hopping configuration or a different BWP.

In a twelfth aspect, alone or in combination with one or more of the first through eleventh aspects, process 700 includes identifying the BWP that is associated with the random access procedure based at least in part on a configuration of the BWP that is associated with the random access procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
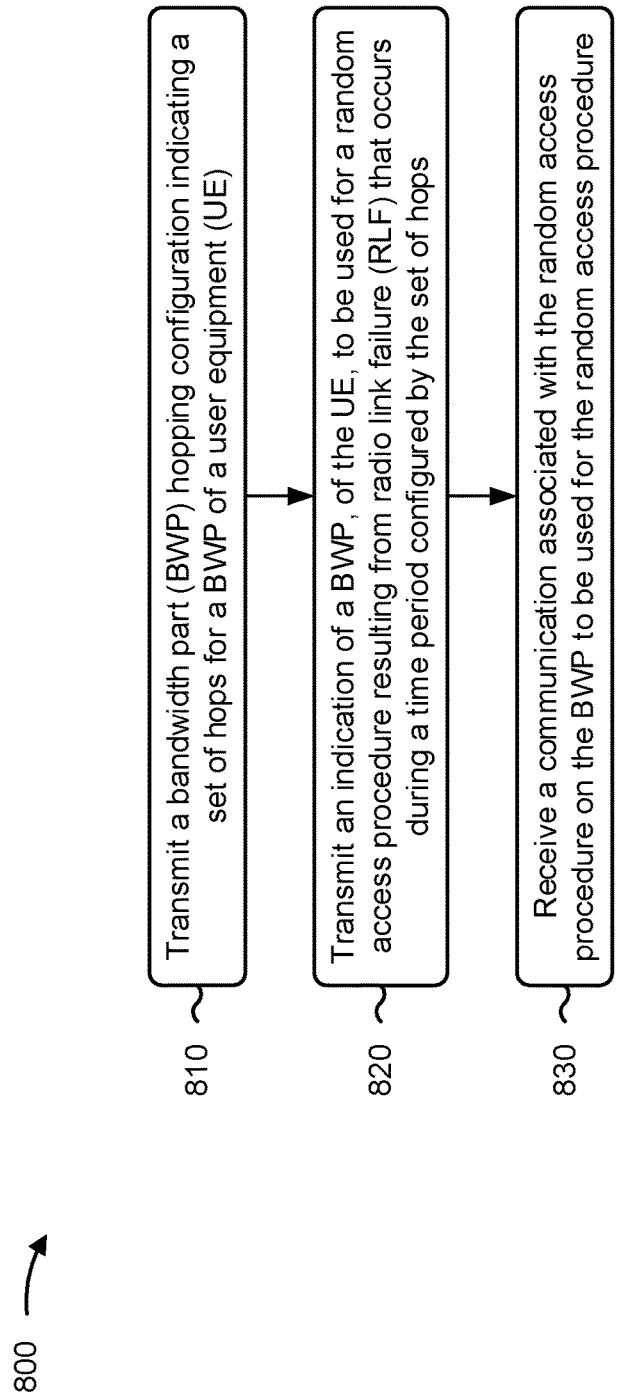
FIG. 8 is a diagram illustrating an example process associated with radio link failure during BWP hopping, in accordance with the present disclosure.

FIG. 8 is a diagram illustrating an example process 800 performed, for example, by a base station, in accordance with the present disclosure. Example process 800 is an example where the base station (e.g., base station 110) performs operations associated with techniques for radio link failure recovery during.

As shown in FIG. 8, in some aspects, process 800 may include transmitting a BWP hopping configuration indicating a set of hops for a BWP of a UE (block 810). For example, the base station (e.g., using communication manager 150 and/or transmission component 1004 or configuration component 1008, depicted in FIG. 10) may transmit a BWP hopping configuration indicating a set of hops for a BWP of a UE, as described above.

As further shown in FIG. 8, in some aspects, process 800 may include transmitting an indication of a BWP, of the UE, to be used for a random access procedure resulting from RLF that occurs during a time period configured by the set of hops (block 820). For example, the base station (e.g., using communication manager 150 and/or transmission component 1004, depicted in FIG. 10) may transmit an indication of a BWP, of the UE, to be used for a random access procedure resulting from RLF that occurs during a time period configured by the set of hops, as described above.

As further shown in FIG. 8, in some aspects, process 800 may include receiving a communication associated with the random access procedure on the BWP to be used for the random access procedure (block 830). For example, the base station (e.g., using communication manager 150 and/or reception component 1002, depicted in FIG. 10) may receive a communication associated with the random access procedure on the BWP to be used for the random access procedure, as described above.

Process 800 may include additional aspects, such as any single aspect or any combination of aspects described below and/or in connection with one or more other processes described elsewhere herein.

In a first aspect, the random access procedure is a random access resource selection procedure.

In a second aspect, alone or in combination with the first aspect, process 800 includes receiving, from the UE, an indication that the BWP hopping configuration has been disabled.

In a third aspect, alone or in combination with one or more of the first and second aspects, the indication that the BWP hopping configuration has been disabled is received prior to the communication associated with the random access procedure.

In a fourth aspect, alone or in combination with one or more of the first through third aspects, process 800 includes receiving, from the UE, an indication of a switch to the BWP to be used for the random access procedure.

In a fifth aspect, alone or in combination with one or more of the first through fourth aspects, the BWP to be used for the random access procedure has a bandwidth that is included in a bandwidth of a hop of the set of hops indicated in the BWP hopping configuration.

In a sixth aspect, alone or in combination with one or more of the first through fifth aspects, the BWP to be used for the random access procedure has a bandwidth that is not included in a bandwidth of any hop of the set of hops indicated in the BWP hopping configuration.

In a seventh aspect, alone or in combination with one or more of the first through sixth aspects, the BWP to be used for the random access procedure comprises one of a default BWP or an anchor BWP indicated by a pre-configuration.

In an eighth aspect, alone or in combination with one or more of the first through seventh aspects, the BWP to be used for the random access procedure is the BWP associated with the BWP hopping configuration.

In a ninth aspect, alone or in combination with one or more of the first through eighth aspects, the random access procedure is initiated in a bandwidth of a most recent hop of the BWP hopping configuration.

In a tenth aspect, alone or in combination with one or more of the first through ninth aspects, process 800 includes transmitting, to the UE, an indication of whether the BWP to be used for the random access procedure is the BWP associated with the BWP hopping configuration or a different BWP.

In an eleventh aspect, alone or in combination with one or more of the first through tenth aspects, process 800 includes receiving, from the UE, an indication that a timer has been activated.

In a twelfth aspect, alone or in combination with one or more of the first through eleventh aspects, the timer comprises a random access channel back-off timer.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
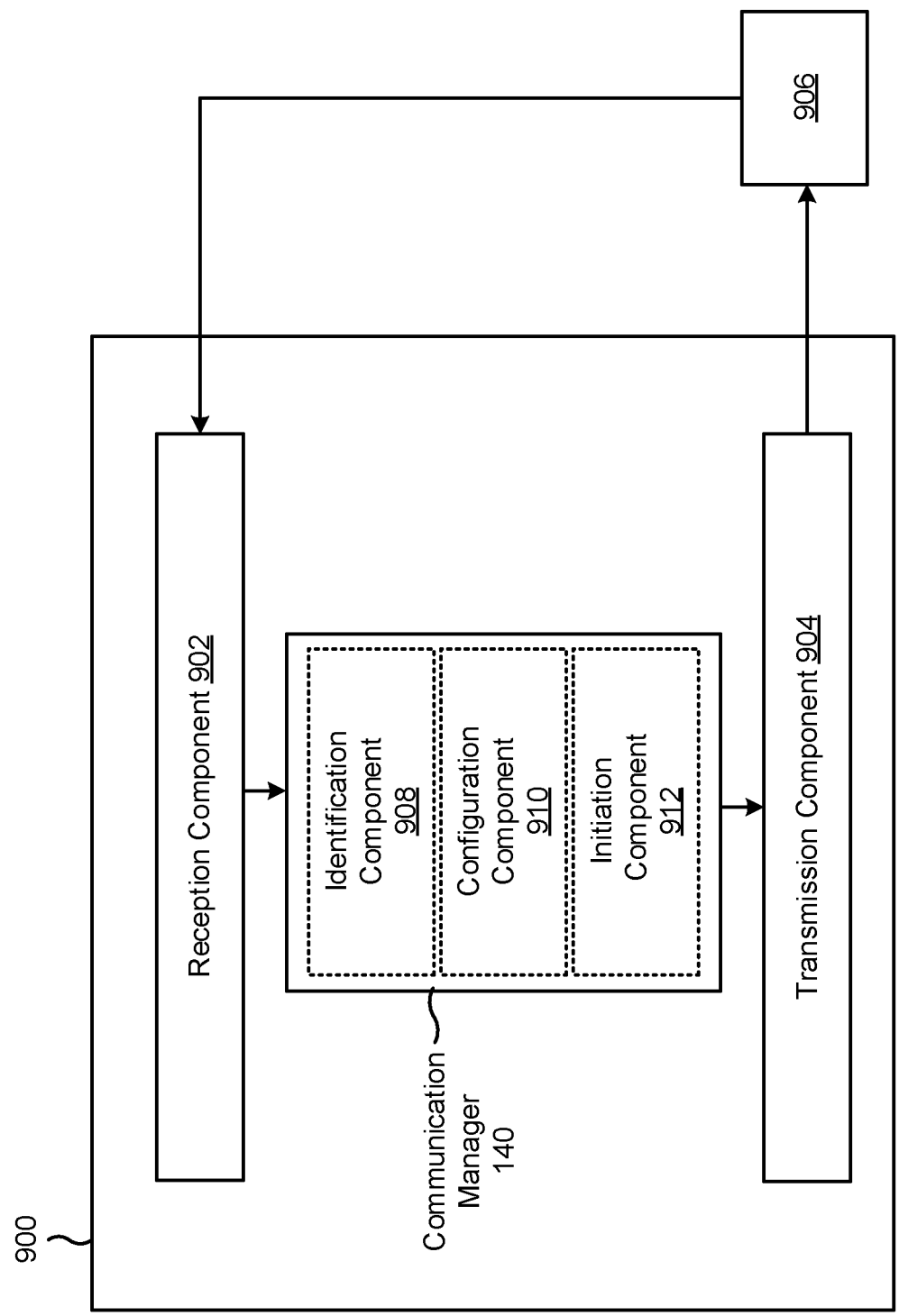
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an identification component 908, a configuration component 910, or an initiation component 912, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a BWP hopping configuration indicating a set of hops for a BWP of the UE. The identification component 908 may identify a RLF during a time period configured by the set of hops. The configuration component 910 may disable the BWP hopping configuration based at least in part on identifying the RLF. The initiation component 912 may initiate a random access procedure on a BWP that is associated with the random access procedure.

The initiation component 912 may switch to the BWP that is associated with the random access procedure.

The configuration component 910 may activate, after switching to the BWP that is associated with the random access procedure, a timer.

The reception component 902 may receive an indication of whether the BWP that is associated with the random access procedure is the BWP associated with the BWP hopping configuration or a different BWP.

The identification component 908 may identify the BWP that is associated with the random access procedure based at least in part on a configuration of the BWP that is associated with the random access procedure.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
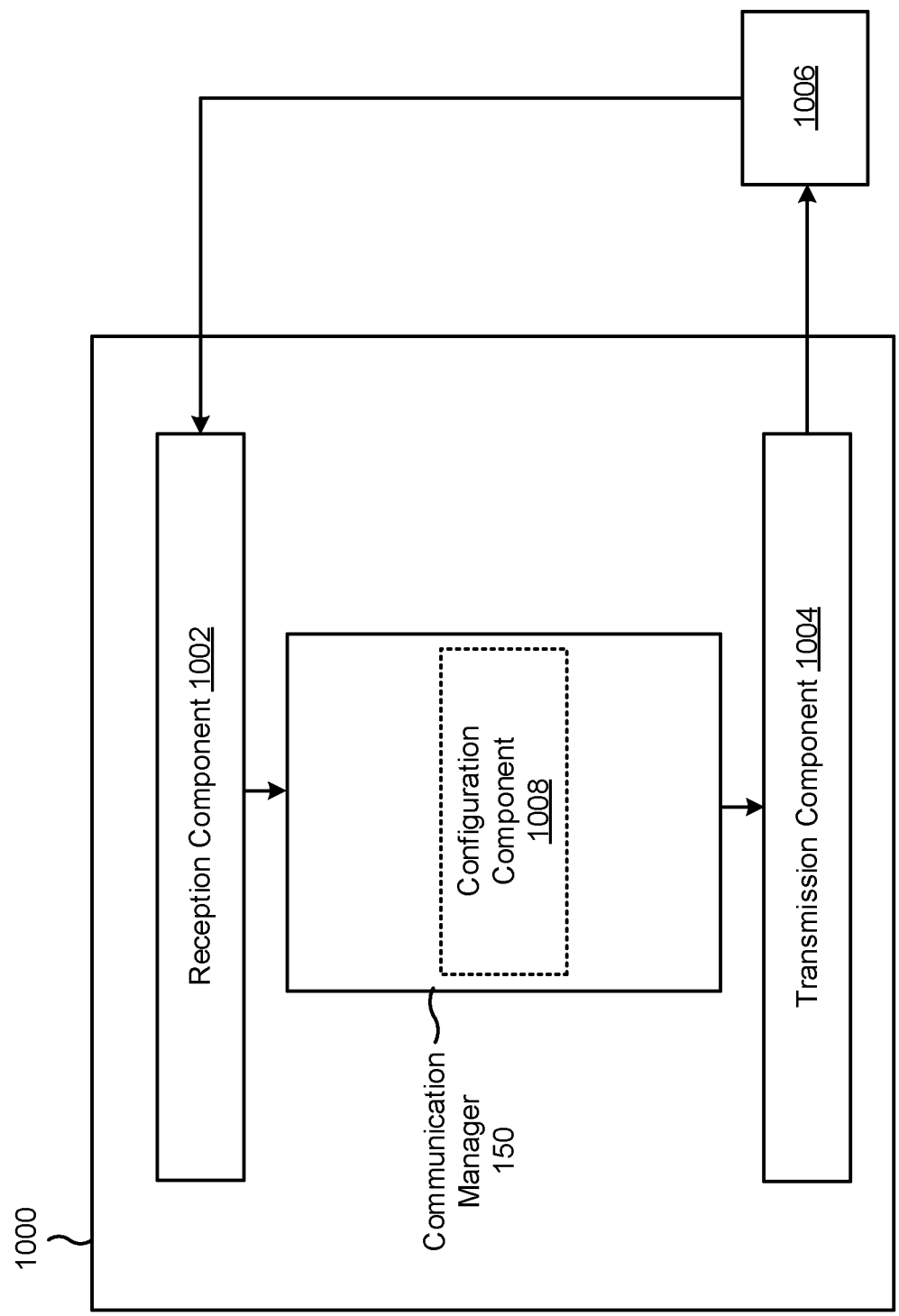
FIG. 10 is a diagram of an example apparatus for wireless communication, in accordance with the present disclosure.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 or the configuration component 1008 may transmit a BWP hopping configuration indicating a set of hops for a BWP of a UE. The transmission component 1004 may transmit an indication of a BWP, of the UE, to be used for a random access procedure resulting from RLF that occurs during a time period configured by the set of hops. The reception component 1002 may receive a communication associated with the random access procedure on the BWP to be used for the random access procedure.

The reception component 1002 may receive, from the UE, an indication that the BWP hopping configuration has been disabled.

The reception component 1002 may receive, from the UE, an indication of a switch to the BWP to be used for the random access procedure.

The transmission component 1004 may transmit, to the UE, an indication of whether the BWP to be used for the random access procedure is the BWP associated with the BWP hopping configuration or a different BWP.

The reception component 1002 may receive, from the UE, an indication that a timer has been activated.

The configuration component 1008 may transmit configuration information, such as the BWP hopping configuration information shown by reference number 602 in FIG. 6, information indicating switching to a certain BWP of the BWP hopping configuration, or the like.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a bandwidth part (BWP) hopping configuration indicating a set of hops for a BWP of the UE; identifying a radio link failure (RLF) during a time period configured by the set of hops; disabling the BWP hopping configuration based at least in part on identifying the RLF; and initiating a random access procedure on a BWP that is associated with the random access procedure.

Aspect 2: The method of Aspect 1, wherein initiating the random access procedure comprises performing random access resource selection.

Aspect 3: The method of any of Aspects 1-3, further comprising switching to the BWP that is associated with the random access procedure.

Aspect 4: The method of Aspect 3, wherein the BWP that is associated with the random access procedure has a bandwidth that is included in a bandwidth of a hop of the set of hops indicated in the BWP hopping configuration.

Aspect 5: The method of Aspect 3, wherein the BWP that is associated with the random access procedure has a bandwidth that is not included in a bandwidth of any hop of the set of hops indicated in the BWP hopping configuration.

Aspect 6: The method of Aspect 3, wherein the BWP that is associated with the random access procedure comprises one of a default BWP or an anchor BWP indicated by a pre-configuration.

Aspect 7: The method of Aspect 3, further comprising activating, after switching to the BWP that is associated with the random access procedure, a timer.

Aspect 8: The method of Aspect 7, wherein the timer comprises a random access channel back-off timer.

Aspect 9: The method of Aspect 3, wherein switching to the BWP that is associated with the random access procedure comprises switching, prior to disabling the BWP hopping configuration, to the BWP that is associated with the random access procedure.

Aspect 10: The method of any of Aspects 1-9, wherein the BWP that is associated with the random access procedure is the BWP associated with the BWP hopping configuration.

Aspect 11: The method of Aspect 10, wherein the random access procedure is initiated in a bandwidth of a most recent hop of the BWP hopping configuration.

Aspect 12: The method of any of Aspects 1-11, further comprising receiving an indication of whether the BWP that is associated with the random access procedure is the BWP associated with the BWP hopping configuration or a different BWP.

Aspect 13: The method of any of Aspects 1-12, further comprising identifying the BWP that is associated with the random access procedure based at least in part on a configuration of the BWP that is associated with the random access procedure.

Aspect 14: A method of wireless communication performed by a base station, comprising: transmitting a bandwidth part (BWP) hopping configuration indicating a set of hops for a BWP of a user equipment (UE); transmitting an indication of a BWP, of the UE, to be used for a random access procedure resulting from radio link failure (RLF) that occurs during a time period configured by the set of hops; and receiving a communication associated with the random access procedure on the BWP to be used for the random access procedure.

Aspect 15: The method of Aspect 14, wherein the random access procedure is a random access resource selection procedure.

Aspect 16: The method of any of Aspects 14-15, further comprising receiving, from the UE, an indication that the BWP hopping configuration has been disabled.

Aspect 17: The method of Aspect 16, wherein the indication that the BWP hopping configuration has been disabled is received prior to the communication associated with the random access procedure.

Aspect 18: The method of any of Aspects 14-17, further comprising receiving, from the UE, an indication of a switch to the BWP to be used for the random access procedure.

Aspect 19: The method of any of Aspects 14-18, wherein the BWP to be used for the random access procedure has a bandwidth that is included in a bandwidth of a hop of the set of hops indicated in the BWP hopping configuration.

Aspect 20: The method of any of Aspects 14-19, wherein the BWP to be used for the random access procedure has a bandwidth that is not included in a bandwidth of any hop of the set of hops indicated in the BWP hopping configuration.

Aspect 21: The method of any of Aspects 14-20, wherein the BWP to be used for the random access procedure comprises one of a default BWP or an anchor BWP indicated by a pre-configuration.

Aspect 22: The method of any of Aspects 14-21, wherein the BWP to be used for the random access procedure is the BWP associated with the BWP hopping configuration.

Aspect 23: The method of Aspect 22, wherein the random access procedure is initiated in a bandwidth of a most recent hop of the BWP hopping configuration.

Aspect 24: The method of any of Aspects 14-23, further comprising transmitting, to the UE, an indication of whether the BWP to be used for the random access procedure is the BWP associated with the BWP hopping configuration or a different BWP.

Aspect 25: The method of any of Aspects 14-24, further comprising receiving, from the UE, an indication that a timer has been activated.

Aspect 26: The method of Aspect 25, wherein the timer comprises a random access channel back-off timer.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        receive a bandwidth part (BWP) hopping configuration indicating a set of hops for a BWP of the UE;
        identify a radio link failure (RLF) during a time period configured by the set of hops;
        disable the BWP hopping configuration based at least in part on identifying the RLF; and
        initiate a random access procedure on a BWP that is associated with the random access procedure.

2. The apparatus of claim 1, wherein the one or more processors, to initiate the random access procedure, are configured to perform random access resource selection.

3. The apparatus of claim 1, wherein the one or more processors are further configured to switch to the BWP that is associated with the random access procedure.

4. The apparatus of claim 3, wherein the BWP that is associated with the random access procedure has a bandwidth that is included in a bandwidth of a hop of the set of hops indicated in the BWP hopping configuration.

5. The apparatus of claim 3, wherein the BWP that is associated with the random access procedure has a bandwidth that is not included in a bandwidth of any hop of the set of hops indicated in the BWP hopping configuration.

6. The apparatus of claim 3, wherein the BWP that is associated with the random access procedure comprises one of a default BWP or an anchor BWP indicated by a preconfiguration.

7. The apparatus of claim 3, wherein the one or more processors are further configured to activate, after switching to the BWP that is associated with the random access procedure, a timer.

8. The apparatus of claim 7, wherein the timer comprises a random access channel back-off timer.

9. The apparatus of claim 3, wherein the one or more processors, to switch to the BWP that is associated with the random access procedure, are configured to switch, prior to disabling the BWP hopping configuration, to the BWP that is associated with the random access procedure.

10. The apparatus of claim 1, wherein the BWP that is associated with the random access procedure is the BWP associated with the BWP hopping configuration.

11. The apparatus of claim 10, wherein the random access procedure is initiated in a bandwidth of a most recent hop of the BWP hopping configuration.

12. The apparatus of claim 1, wherein the one or more processors are further configured to receive an indication of whether the BWP that is associated with the random access procedure is the BWP associated with the BWP hopping configuration or a different BWP.

13. The apparatus of claim 1, wherein the one or more processors are further configured to identify the BWP that is associated with the random access procedure based at least in part on a configuration of the BWP that is associated with the random access procedure.

14. An apparatus for wireless communication at a base station, comprising:
    a memory; and
    one or more processors, coupled to the memory, configured to:
        transmit a bandwidth part (BWP) hopping configuration indicating a set of hops for a BWP of a user equipment (UE);

transmit an indication of a BWP, of the UE, to be used for a random access procedure resulting from radio link failure (RLF) that occurs during a time period configured by the set of hops; and receive a communication associated with the random access procedure on the BWP to be used for the random access procedure.

15. The apparatus of claim 14, wherein the random access procedure is a random access resource selection procedure.

16. The apparatus of claim 14, wherein the one or more processors are further configured to receive, from the UE, an indication that the BWP hopping configuration has been disabled.

17. The apparatus of claim 14, wherein the one or more processors are further configured to receive, from the UE, an indication of a switch to the BWP to be used for the random access procedure.

18. The apparatus of claim 14, wherein the BWP to be used for the random access procedure has a bandwidth that is included in a bandwidth of a hop of the set of hops indicated in the BWP hopping configuration.

19. The apparatus of claim 14, wherein the BWP to be used for the random access procedure has a bandwidth that is not included in a bandwidth of any hop of the set of hops indicated in the BWP hopping configuration.

20. The apparatus of claim 14, wherein the BWP to be used for the random access procedure comprises one of a default BWP or an anchor BWP indicated by a pre-configuration.

21. The apparatus of claim 14, wherein the BWP to be used for the random access procedure is the BWP associated with the BWP hopping configuration.

22. The apparatus of claim 14, wherein the one or more processors are further configured to transmit, to the UE, an indication of whether the BWP to be used for the random access procedure is the BWP associated with the BWP hopping configuration or a different BWP.

23. A method of wireless communication performed by a user equipment (UE), comprising:
receiving a bandwidth part (BWP) hopping configuration indicating a set of hops for a BWP of the UE;
identifying a radio link failure (RLF) during a time period configured by the set of hops;
disabling the BWP hopping configuration based at least in part on identifying the RLF; and
initiating a random access procedure on a BWP that is associated with the random access procedure.

24. The method of claim 23, further comprising switching to the BWP that is associated with the random access procedure.

25. The method of claim 24, wherein the BWP that is associated with the random access procedure has a bandwidth that is included in a bandwidth of a hop of the set of hops indicated in the BWP hopping configuration.

26. The method of claim 24, wherein the BWP that is associated with the random access procedure has a bandwidth that is not included in a bandwidth of any hop of the set of hops indicated in the BWP hopping configuration.

27. The method of claim 23, wherein the BWP that is associated with the random access procedure is the BWP associated with the BWP hopping configuration.

28. A method of wireless communication performed by a base station, comprising:
transmitting a bandwidth part (BWP) hopping configuration indicating a set of hops for a BWP of a user equipment (UE);
transmitting an indication of a BWP, of the UE, to be used for a random access procedure resulting from radio link failure (RLF) that occurs during a time period configured by the set of hops; and
receiving a communication associated with the random access procedure on the BWP to be used for the random access procedure.

29. The method of claim 28, wherein the BWP to be used for the random access procedure has a bandwidth that is included in a bandwidth of a hop of the set of hops indicated in the BWP hopping configuration.

30. The method of claim 28, wherein the BWP to be used for the random access procedure has a bandwidth that is not included in a bandwidth of any hop of the set of hops indicated in the BWP hopping configuration.

* * * * *